(12) United States Patent
Ye (10) Patent No.: US 9,813,980 B2
(45) Date of Patent: Nov. 7, 2017

(54) METHODS FOR ASSISTING MOBILE COMMUNICATION DEVICES IN CONNECTING TO AN ACCESS POINT (AP), AND MOBILE COMMUNICATION DEVICES AND BASE STATIONS USING THE SAME

(71) Applicant: Acer Incorporated, New Taipei (TW)

(72) Inventor: Shiang-Rung Ye, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 14/176,321

(22) Filed: Feb. 10, 2014

(65) Prior Publication Data

US 2014/0287744 A1    Sep. 25, 2014

Related U.S. Application Data

(60) Provisional application No. 61/804,207, filed on Mar. 22, 2013.

(51) Int. Cl.
*H04W 4/00* (2009.01)
*H04W 48/20* (2009.01)
(Continued)

(52) U.S. Cl.
CPC ........... *H04W 48/20* (2013.01); *H04W 4/008* (2013.01); *H04W 48/08* (2013.01); *H04W 48/18* (2013.01);
(Continued)

(58) Field of Classification Search
CPC ..... H04W 48/20; H04W 84/12; H04W 48/08; H04W 36/14; H04W 36/22; H04W 36/32;
(Continued)

(56) References Cited

U.S. PATENT DOCUMENTS

2004/0259546 A1    12/2004    Balachandran et al.
2006/0063560 A1     3/2006    Herle
(Continued)

OTHER PUBLICATIONS

European Search Report dated Jul. 8, 2014.

*Primary Examiner* — Kathy Wang-Hurst
*Assistant Examiner* — B.M. M Hannan
(74) *Attorney, Agent, or Firm* — McClure, Qualey & Rodack, LLP (57) ABSTRACT

A mobile communication device is provided with two wireless modules and a controller module. The first and second wireless modules perform wireless transmission and reception using a telecommunication technology and an SRW technology, respectively. The controller module receives distance information of one or more APs, or location information of the APs and the base station, from a base station via the wireless module, and determines a first distance from the mobile communication device to the base station according to an uplink timing adjustment received from the base station via the wireless module. Also, the controller module determines one or more second distances from the APs to the base station according to the received distance information or location information, and scans for the APs which have the corresponding second distances approximate to the first distance, to connect to one of the scanned APs via the second wireless module.

10 Claims, 5 Drawing Sheets

(51) Int. Cl.
*H04W 48/08* (2009.01)
*H04W 48/18* (2009.01)
*H04W 64/00* (2009.01)
*H04W 84/12* (2009.01)
*H04W 88/06* (2009.01)

(52) U.S. Cl.
CPC .......... *H04W 64/003* (2013.01); *H04W 84/12* (2013.01); *H04W 88/06* (2013.01)

(58) Field of Classification Search
CPC ....... H04W 48/18; H04W 4/02; H04W 88/06; H04W 24/00; H04W 28/0226; H04W 36/0022; H04W 36/0066; H04W 36/165; H04W 36/36; H04W 48/16; H04W 4/008; H04W 64/00; H04W 64/003; H04W 80/00; Y02B 60/50
USPC ........... 455/41.2, 426.1, 435.2, 456.6, 552.1, 455/553.1, 436–444, 404.2, 414.2, 455/456.1–456.3; 370/338, 229, 235, 370/331–333
See application file for complete search history.

(56) References Cited

U.S. PATENT DOCUMENTS

| | | | |
|---|---|---|---|
| 2006/0148487 A1* | 7/2006 | Kim | G01S 5/02 455/456.1 |
| 2006/0240840 A1* | 10/2006 | Morgan et al. | 455/456.1 |
| 2007/0008941 A1* | 1/2007 | Narasimha et al. | 370/338 |
| 2009/0059879 A1* | 3/2009 | Yamaoka | H04W 48/18 370/338 |
| 2009/0061892 A1* | 3/2009 | Lee | H04W 48/20 455/456.1 |
| 2009/0103503 A1 | 4/2009 | Chhabra | |
| 2009/0160711 A1* | 6/2009 | Mehta | 342/450 |
| 2010/0103844 A1* | 4/2010 | Kim | H04W 48/16 370/254 |
| 2012/0044822 A1* | 2/2012 | Kim et al. | 370/252 |
| 2012/0108263 A1* | 5/2012 | Zhang | 455/456.1 |
| 2013/0163463 A1* | 6/2013 | Grayson | H04L 43/0876 370/253 |
| 2014/0045520 A1* | 2/2014 | Lim et al. | 455/456.1 |
| 2014/0087752 A1* | 3/2014 | Zhu | H04W 24/00 455/456.1 |
| 2014/0141779 A1* | 5/2014 | Yuk | H04W 56/00 455/434 |

* cited by examiner

METHODS FOR ASSISTING MOBILE COMMUNICATION DEVICES IN CONNECTING TO AN ACCESS POINT (AP), AND MOBILE COMMUNICATION DEVICES AND BASE STATIONS USING THE SAME

CROSS REFERENCE TO RELATED APPLICATIONS

This Application claims priority of U.S. Provisional Application No. 61/804,207, filed on Mar. 22, 2013, the entirety of which is incorporated by reference herein.

BACKGROUND OF THE INVENTION

Field of the Invention

The invention generally relates to coordination of wireless communications with heterogeneous radio networks, and more particularly, to assisting a mobile communication device in connecting to an Access Point (AP) by a base station.

Description of the Related Art

With growing demand for ubiquitous computing and networking, various wireless technologies have been developed, such as the Short Range Wireless (SRW) technologies, including the Wireless Fidelity (WiFi) technology, Bluetooth technology, and the ZigBee technology, etc., as well as the telecommunication technologies, including the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced technology, and Time-Division LTE (TD-LTE) technology, etc.

For user convenience and flexibility, most Mobile Stations (MSs) (also referred to as User Equipments (UEs)) nowadays are equipped with more than one wireless communication module for supporting different wireless technologies. However, each supported wireless technology has its own features, such as bandwidth, average coverage, and service rate, etc. In particular, the bandwidth and coverage provided to an MS by a wireless network may vary according to the location conditions of the MS and/or the time conditions.

Taking an MS equipped with a WCDMA module and a WiFi module as an example, it may selectively obtain wireless services using the WCDMA technology or the WiFi technology. The wireless services obtained using the WCDMA technology generally have a rather limited bandwidth, but better mobility, while the wireless services obtained using the WiFi technology generally have a sufficient bandwidth, but lack mobility.

Conventionally, the WiFi module is initially turned off and needs to be turned on manually to perform a full scan for every possible AP nearby. Next, the MS may connect to one of the scanned APs, which is determined manually and randomly by the user of the MS or determined automatically by the MS with a previous connection history. However, it is very likely that the connected AP may not have the best channel quality or signal quality, or enough bandwidth among all available APs, or even worse, the connected AP may not be suitable for providing stable services, which would require further connection attempts by the MS to select another AP, thereby causing a waste of time and power.

BRIEF SUMMARY OF THE INVENTION

In order to solve the aforementioned problem, the invention proposes mobile communication devices, base stations, and methods for assisting mobile communication devices in connecting to an AP.

In one aspect of the invention, a mobile communication device is provided. The mobile communication device comprises a first wireless module, a second wireless module, and a controller module. The first wireless module performs wireless transmission and reception to and from a base station using a telecommunication technology. The second wireless module performs wireless transmission and reception using an SRW technology. The controller module receives distance information of one or more APs, or location information of the APs and the base station, from the base station via the wireless module, and determines a first distance from the mobile communication device to the base station according to an uplink timing adjustment received from the base station via the wireless module. Also, the controller module determines one or more second distances from the APs to the base station according to the received distance information or location information, and scans for the APs which have the corresponding second distances approximate to the first distance, to connect to one of the scanned APs via the second wireless module.

In another aspect of the invention, a base station providing a cellular access service in a cell coverage area is provided. The base station comprises a wireless module and a controller module. The wireless module performs wireless transmission and reception to and from a mobile communication device using a telecommunication technology. The controller module determines one or more APs providing an SRW service in the cell coverage area, and sends distance information of the APs, or location information of the APs and the base station to the mobile communication device via the wireless module.

In yet another aspect of the invention, a method for assisting a mobile communication device in connecting to an AP is provided. The method comprises the steps of: sending, by the base station, distance information of one or more APs which provide an SRW service in a cell coverage of the base station, or location information of the APs and the base station to the mobile communication device; determining, by the mobile communication device, a first distance from the mobile communication device to the base station according to an uplink timing adjustment received from the base station; determining, by the mobile communication device, one or more second distances from the APs to the base station according to the received distance information or location information; and scanning, by the mobile communication device, for the APs which have the corresponding second distances approximate to the first distance, to connect to one of the scanned APs.

Other aspects and features of the present invention will become apparent to those with ordinarily skill in the art upon review of the following descriptions of specific embodiments of the mobile communication devices, the base stations, and the methods for assisting a mobile communication device in connecting to an AP.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
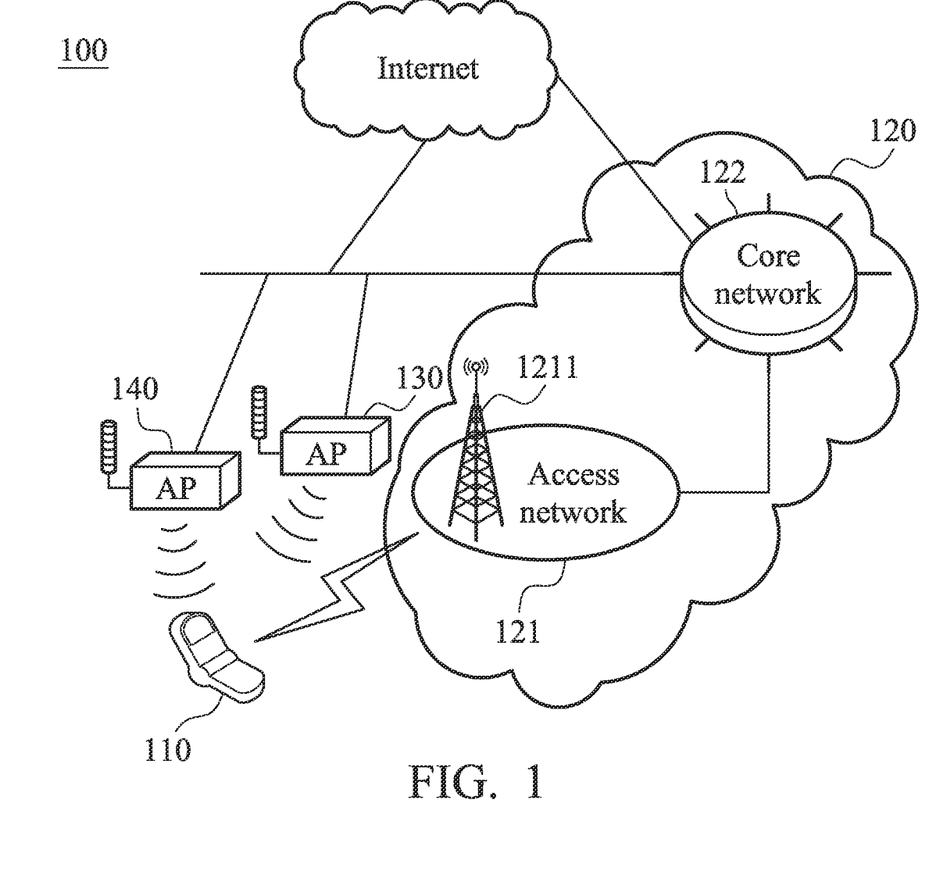
FIG. 1 is a block diagram of a wireless communications environment according to an embodiment of the invention.

FIG. 1 is a block diagram of a wireless communications environment according to an embodiment of the invention. The wireless communications environment 100 comprises a mobile communication device 110, a telecommunication network 120 and APs 130 and 140. The mobile communication device 110 may be a smartphone, a panel Personal Computer (PC), a laptop computer, or any computing device supporting at least the SRW technology utilized by the APs 130 and 140 and the telecommunication technology utilized by the telecommunication network 120. The mobile communication device 110 may selectively connect to one or both of the telecommunication network 120 and the AP 130 or 140 for obtaining wireless services. The telecommunication network 120 may be a GSM system, GPRS system, WCDMA system, CDMA-2000 system, TD-SCDMA system, WiMAX system, LTE system, LTE-Advanced system, or TD-LTE system, etc., depending on the telecommunication technology in use. The telecommunication network 120 comprises at least an access network 121 and a core network 122, wherein the access network 121 is responsible for processing radio signals, terminating radio protocols, and connecting the mobile communication device 10 with the core network 220, and the core network 122 is responsible for performing mobility management, network-side authentication, and interfaces with public networks. The access network 121 comprises at least a base station 1211 for providing the functionality of wireless transceiving for the telecommunication network 120. Alternatively, the access network 121 may further comprise a base station controller for controlling the operation of the base station.

For example, if the telecommunication network 120 is a WCDMA system, the access network 121 may be a Universal Terrestrial Radio Access Network (UTRAN) which includes at least a Node-B (NB) and a Radio Network Controller (RNC), and the core network 122 may be a General Packet Radio Service (GPRS) core which includes a Home Location Register (HLR), at least one Serving GPRS Support Node (SGSN), and at least one Gateway GPRS Support Node (GGSN). Alternatively, if the telecommunication network 120 is an LTE or LTE-Advanced system, the access network 121 may be an Evolved-UTRAN (E-UTRAN) which includes at least an evolved NB (eNB), and the core network 122 may be an Evolved Packet Core (EPC) which includes a Home Subscriber Server (HSS), Mobility Management Entity (MME), Serving Gateway (S-GW), and Packet Data Network Gateway (PDN-GW or P-GW).

The APs 130 and 140 may each form an SRW network, implemented as alternatives for providing wireless services for the mobile communication device 110. For example, the APs 130 and 140 may be deployed by or operate in cooperation with the operator of the telecommunication network 120 or the partner of the operator of the telecommunication network 120. Specifically, the APs 130 and 140 may connect to a local area network by an Ethernet cable, and they typically receive, buffer, and transmit data traffic which is to be directed to and from the mobile communication device 110. The APs 130 and 140 may be connected to the core network 122 directly or via the Internet, as shown in FIG. 1. In general, for the APs 130 and 140 utilizing the WiFi technology, each of them may have, on average, a coverage varying from 20 meters in an area with obstacles (walls, stairways, elevators etc) to 100 meters in an area with a clear line of sight. Alternatively, the APs 130 and 140 may utilize another SRW technology, such as the Bluetooth technology, the ZigBee technology, or others, and the invention is not limited thereto.

Figure 2:
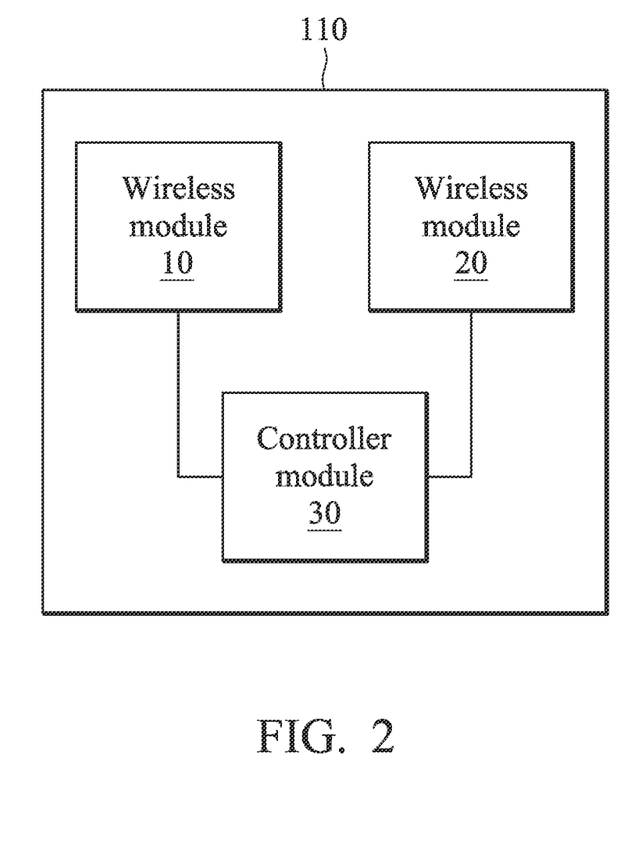
FIG. 2 is a block diagram illustrating the mobile communication device 110 according to an embodiment of the invention.

FIG. 2 is a block diagram illustrating the mobile communication device 110 according to an embodiment of the invention. The mobile communication device 110 comprises two wireless modules 10 and 20, and a controller module 30. The wireless module 10 is responsible for performing the functionality of wireless transmission and reception to and from the telecommunication network 120. The wireless module 20 is responsible for performing wireless transmission and reception to and from the AP 130 or 140. The controller module 30 is responsible for controlling the operations of the wireless modules 10 and 20, and other functional components (not shown), such as a display unit and/or keypad serving as the Man-Machine Interface (MMI), a storage unit storing the program codes of applications or communication protocols, a Global Positioning System (GPS) unit for obtaining location information, or others. Also, the controller module 30 controls the wireless modules 10 and 20 for performing the method for assisting the mobile communication device 110 in connecting to the AP 130 or 140 when camped on the base station 1211.

To further clarify, each of the wireless modules 10 and 20 may be a respective Radio Frequency (RF) unit, and the controller module 30 may be a general-purpose processor or a Micro Control Unit (MCU) of a baseband unit (not shown). The baseband unit may contain multiple hardware devices to perform baseband signal processing, including analog-to-digital conversion (ADC)/digital-to-analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communication system, wherein the radio frequency may be 2.4 GHz, 3.6 GHz, 4.9 GHz, or 5 GHz utilized in WiFi technology, or 900 MHz, 1900 MHz, or 2100 MHz utilized in WCDMA technology, or 900 MHz, 2100 MHz, or 2.6 GHz utilized in LTE/LTE-Advanced technology, or others depending on the wireless technology in use.

Similar to the embodiment of FIG. 2, the base station 1211 may comprise a wireless module (not shown) and a controller module (not shown), wherein the wireless module is configured to perform the functionality of wireless transceiving to and from the mobile communication device 110 using a telecommunication technology, and the controller module is configured to control the operation of the wireless module for performing the method for assisting the mobile communication device 110 in connecting to the AP 130 or 140 when camped on the base station 1211. Regarding the detailed description of the wireless module and the controller module in similarity, reference may be made to the embodiment of FIG. 2.

Figure 3:
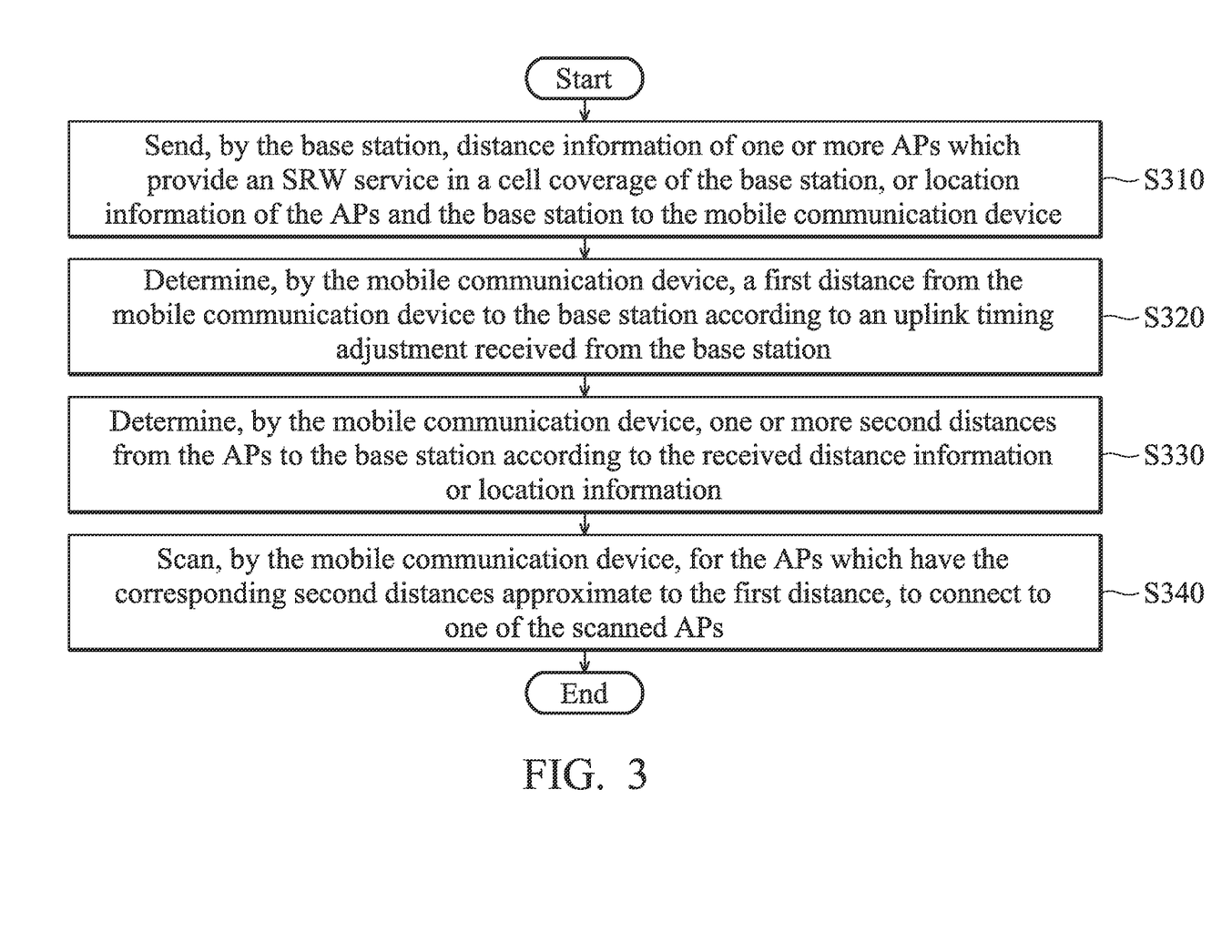
FIG. 3 is a flow chart illustrating the method for assisting a mobile communication device in connecting to an AP when camped on a base station according to an embodiment of the invention.

FIG. 3 is a flow chart illustrating the method for assisting a mobile communication device in connecting to an AP by a base station according to an embodiment of the invention. The method may be applied in the Radio Resource Control (RRC) layer, and/or the Application layer of the communication protocol in use between the mobile communication device and the telecommunication network. In this embodiment, the mobile communication device is initially camped on a base station of a telecommunication network. To begin, the base station sends the distance information of one or more APs which provide an SRW service in a cell coverage area of the base station, or sends the location information of the APs and the base station to the mobile communication device (step S310). In one embodiment, the SRW service may be provided using the WiFi technology. In another embodiment, another SRW technology, such as Bluetooth technology or ZigBee technology, may be used to provide the SRW service, and the invention is not limited thereto.

Next, the mobile communication device determines a first distance from the mobile communication device to the base station according to an uplink timing adjustment received from the base station (step S320). Specifically, the uplink timing adjustment includes information concerning the propagation delay of wireless transceiving between the mobile communication device and the base station, and the propagation delay may be used to derive the first distance from the mobile communication device to the base station.

Subsequently, the mobile communication device determines one or more second distances from the APs to the base station according to the received distance information or location information (step S330). After that, the mobile communication device scans for the APs which have the corresponding second distances approximate to the first distance, to connect to one of the scanned APs (step S340). That is, the scanning for APs only focuses on the APs located at roughly the same distance to the base station as the mobile communication device, and thus, time and power consumption of the mobile communication device may be efficiently saved.

Advantageously, the mobile communication device may determine which APs are located at roughly the same distance to the base station, without activating the Global Positioning System (GPS) module to obtain the location information of itself and to identify the location of the APs, or the mobile communication device does not have to be equipped with a GPS module at all, which further reduces power consumption (when equipped with a GPS module) or simplifies the hardware requirement of the mobile communication device (without a GPS module).

Figure 4:
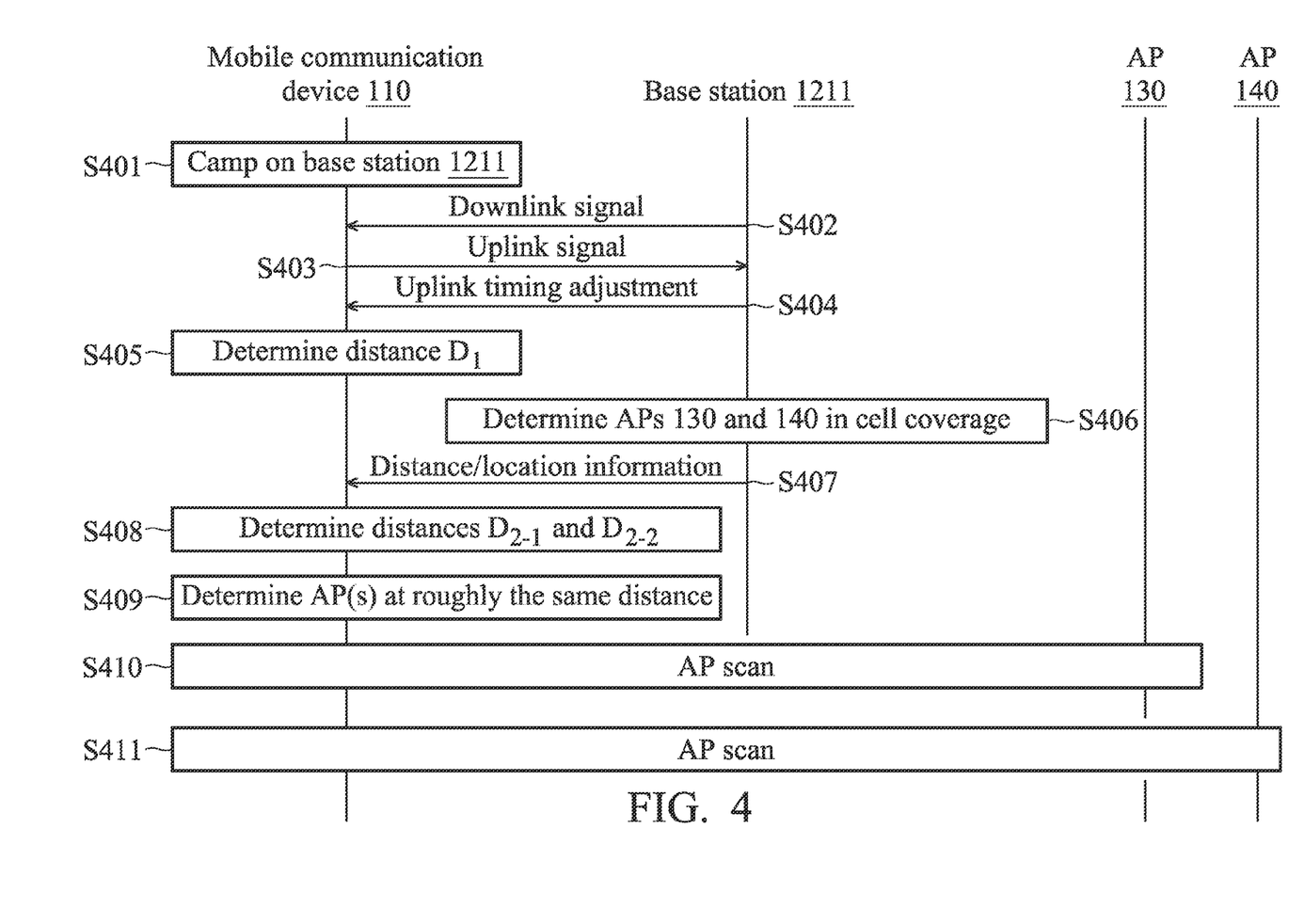
FIG. 4 is a message sequence chart illustrating the assisting of the mobile communication device 110 in connecting to the AP 130 or 140 when camped on the base station 1211 according to an embodiment of the invention.

FIG. 4 is a message sequence chart illustrating the assisting of the mobile communication device 110 in connecting to the AP 130 or 140 when camped on the base station 1211 according to an embodiment of the invention. To begin, the mobile communication device 110 is initially camped on the base station 1211 (step S401). Next, in order to adjust uplink timing for the mobile communication device 110, the base station 1211 sends a downlink signal to the mobile communication device 110 (step S402), and then the mobile communication device replies to the base station 1211 with an uplink signal (step S403). When receiving the uplink signal, the base station 1211 determines the propagation delay of wireless transceiving between the mobile communication device 110 and the base station 1211 according to the timing difference from the sending of the downlink signal to the receiving of the uplink signal, and then sends the uplink timing adjustment, which is derived from the propagation delay, to the mobile communication device 110 (step S404). When receiving the uplink timing adjustment, the mobile communication device 110 determines the distance $D_1$ from the mobile communication device 110 to the base station 1211 according to an uplink timing adjustment (step S405).

In one embodiment, the distance $D_1$ may be derived using the following equation.

$$\left(|N_{TA} - M| \times 16 \times \frac{T_S}{2} - N\right) \times C$$

In the equation, $N_{TA}$ represents the uplink timing adjustment, $T_S$ equals 1/(15000*2048) seconds as specified in the 3GPP Technical Specification (TS) 36.211, M and N are adjustable coefficients, and C represents the speed of light in meters. For example, M and N may be set to 0 at the time when the mobile communication device 110 receives the uplink timing adjustment in step S404, and later when the mobile communication device 110 is moving away from where it received the uplink timing adjustment, M and/or N may be increased or decreased, depending on the Reference Signal Received Power (RSRP) or Reference Signal Received Quality (RSRQ). For example, if the RSRP/RSRQ is getting strong, M and N may be decreased, or otherwise, M and N may be increased.

Subsequently, the base station 1211 determines that APs 130 and 140 are providing SRW services in the cell coverage of the base station 1211 (step S406), and then sends the distance information of the APs 130 and 140, or the location information of the APs 130 and 140 and the base station 1211 to the mobile communication device 110 (step S407). Specifically, the distance information of the APs 130 and 140 indicates the distances between the base station 1211 and each of the APs 130 and 140, and the location information of the APs 130 and 140 and the base station 1211 comprises the latitudes and longitudes of the APs 130 and 140 and the base station 1211. When receiving the distance information of the APs 130 and 140, or the location information of the APs 130 and 140 and the base station 1211, the mobile communication device 110 determines the distances $D_{2-1}$ and $D_{2-2}$ from the APs 130 and 140 to the base station 1211 according to the distance information of the APs 130 and 140, or the location information of the APs 130 and 140 and the base station 1211 (step S408).

Figure 5:
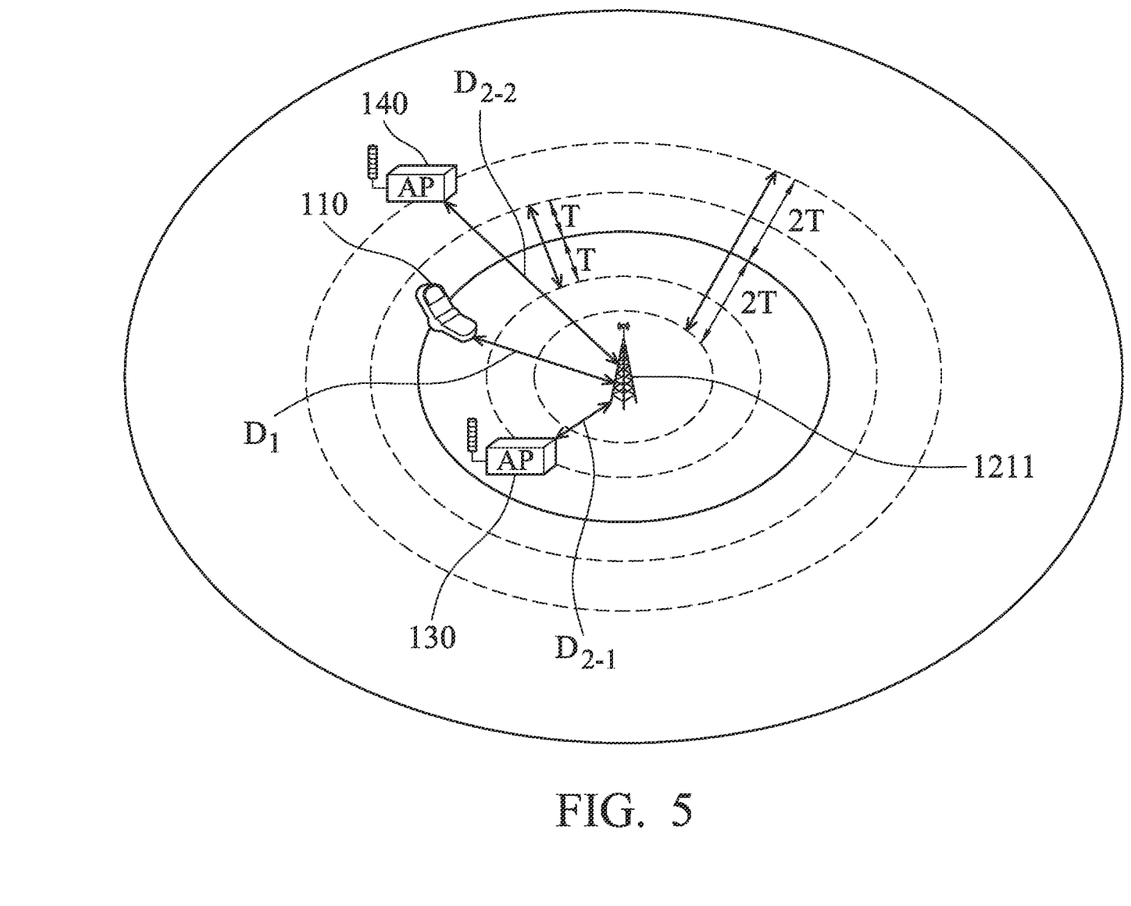
FIG. 5 is a schematic diagram illustrating a layout of the wireless communications environment 100 according to an embodiment of the invention.

After that, the mobile communication device 110 determines which of the APs 130 and 140 has a corresponding distance to the base station 1211, which is approximate to the distance $D_1$ (i.e., determines which of the APs 130 and 140 is located at roughly the same distance), by determining whether the difference between each of the distances $D_{2-1}$ and $D_{2-2}$ and the distance $D_1$ is less than the threshold value T (step S409). As shown in FIG. 5, in this embodiment, since only the difference between the distance $D_{2-1}$ and the distance $D_1$ is less than the threshold value T, the mobile communication device 110 scans for the AP 130 to connect to the AP 130 (step S410). Subsequently, in response to failing to connect to the AP 130, the mobile communication device 110 increases the threshold value to 2T, and then scans for the AP 140 to connect to the AP 140 (step S411). Please note that, the mobile communication device 110 may repeat the increasing of the threshold value in response to no AP being scanned or failing to connect to the scanned AP(s), until successfully connecting to one AP, or all APs are scanned, or the threshold value is greater than the cell coverage of the base station 1211.

While the invention has been described by way of example and in terms of preferred embodiment, it is to be understood that the invention is not limited thereto. Those who are skilled in this technology can still make various alterations and modifications without departing from the scope and spirit of this invention.

Use of ordinal terms such as "first" and "second" in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A mobile communication device, located in a cell coverage of a cellular-type base station, comprising:
    a first wireless module performing wireless transmission and reception to and from the cellular-type base station using a telecommunication technology;
    a second wireless module performing wireless transmission and reception using a Short Range Wireless (SRW) technology; and
    a controller module receiving distance information of one or more Wireless Fidelity (WiFi) Access Points (APs) which provide a SRW service in the cell coverage, or location information of the Wi-Fi APs and the cellular-type base station, from the cellular-type base station via the first wireless module, determining a first distance from the mobile communication device to the cellular-type base station according to an uplink timing adjustment received from the base station via the first wireless module, determining one or more second distances from the Wi-Fi APs to the cellular-type base station according to the received distance information or location information, determining whether a respective difference between each of the second distances and the first distance is less than a threshold value, and scanning for only the Wi-Fi APs which have the corresponding differences less than the threshold value, to connect to one of the scanned Wi-Fi APs via the second wireless module.

2. The mobile communication device of claim 1, wherein the controller module further increases the threshold value in response to no Wi-Fi AP being scanned or failing to connect to the scanned Wi-Fi APs, and repeats the scanning for the Wi-Fi APs according to the increased threshold value.

3. The mobile communication device of claim 1, wherein the distance information of the Wi-Fi APs indicates the second distances from the Wi-Fi APs to the cellular-type base station.

4. The mobile communication device of claim 1, wherein the location information of the Wi-Fi APs and the cellular-type base station comprises latitudes and longitudes of the Wi-Fi APs and the cellular-type base station.

5. The mobile communication device of claim 1, wherein the distance information of the Wi-Fi APs, or the location information of the Wi-Fi APs and the cellular-type base station is received via a broadcast message or a dedicated message.

6. A method for assisting a mobile communication device in connecting to a Wireless Fidelity (Wi-Fi) Access Point (AP), comprising:
    sending, by a cellular-type base station, distance information of one or more Wi-Fi APs which provide a Short Range Wireless (SRW) service in a cell coverage of the cellular-type base station, or location information of the Wi-Fi APs and the cellular-type base station to the mobile communication device in the cell coverage;
    determining, by the mobile communication device, a first distance from the mobile communication device to the cellular-type base station according to an uplink timing adjustment received from the cellular-type base station;
    determining, by the mobile communication device, one or more second distances from the Wi-Fi APs to the cellular-type base station according to the received distance information or location information;
    determining, by the mobile communication device, whether a respective difference between each of the second distances and the first distance is less than a threshold value; and
    scanning, by the mobile communication device, for only the Wi-Fi APs which have the corresponding differences less than the threshold value, to connect to one of the scanned Wi-Fi APs.

7. The method of claim 6, further comprising:
    increasing, by the mobile communication device, the threshold value in response to no Wi-Fi AP being scanned or failing to connect to the scanned Wi-Fi APs; and
    repeating, by the mobile communication device, the scanning for the Wi-Fi APs according to the increased threshold value.

8. The method of claim 6, wherein the distance information of the Wi-Fi APs indicates the second distances from the Wi-Fi APs to the cellular-type base station.

9. The method of claim 6, wherein the location information of the Wi-Fi APs and the cellular-type base station comprises latitudes and longitudes of the Wi-Fi APs and the cellular-type base station.

10. The method of claim 6, wherein the distance information of the Wi-Fi APs, or the location information of the Wi-Fi APs and the cellular-type base station is sent via a broadcast message or a dedicated message.

* * * * *